(12) United States Patent  
Huang et al.

(10) Patent No.: US 12,513,059 B2  
(45) Date of Patent: *Dec. 30, 2025

(54) SERVICE ASSURANCE MONITORING BASED ON TELEMETRY

(71) Applicant: Cisco Technology, Inc., San Jose, CA (US)

(72) Inventors: Scott Zhenlong Huang, San Jose, CA (US); Muthumayan Madhayyan, San Jose, CA (US); Thangavelu Arumugam, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,801

(22) Filed: May 11, 2023

(65) Prior Publication Data

US 2023/0283530 A1 Sep. 7, 2023

Related U.S. Application Data

(63) Continuation of application No. 17/514,272, filed on Oct. 29, 2021, now Pat. No. 11,706,103.

(Continued)

(51) Int. Cl.
*H04L 43/045* (2022.01)
*H04L 12/66* (2006.01)
(Continued)

(52) U.S. Cl.
CPC .............. *H04L 41/50* (2013.01); *H04L 12/66* (2013.01); *H04L 41/0803* (2013.01);
(Continued)

(58) Field of Classification Search
CPC ..... H04L 41/50; H04L 12/66; H04L 41/0803; H04L 43/08; H04L 9/00; H04L 41/5016;
(Continued)

(56) References Cited

U.S. PATENT DOCUMENTS 10,623,264 B2 * 4/2020 Kompella ........... H04L 41/0894  
10,637,744 B2 * 4/2020 Carroll .................... H04L 41/16

(Continued)

OTHER PUBLICATIONS

Gałecki, et al., "Tree-Like Distributed Computation Environment with Shapp Library," www.mdpi.com/journal/information, Mar. 2020, 25 pages.

(Continued)

*Primary Examiner* — Jason D Cardone
(74) *Attorney, Agent, or Firm* — Edell, Shapiro & Finnan, LLC

(57) ABSTRACT

Methods are provided for modifying assurance monitoring of a service based on operational states. The methods involve establishing, based on service configuration information, an assurance monitoring for a service provided by a plurality of network nodes that establish network connectivity for the service. The service includes a plurality of sub-services. The methods further involve obtaining, from the plurality of network nodes, telemetry data related to the service, determining one or more operational states of the plurality of network nodes based on the telemetry data, and modifying the assurance monitoring for the service based on the one or more operational states of the plurality of network nodes.

20 Claims, 6 Drawing Sheets

Related U.S. Application Data

(60) Provisional application No. 63/164,738, filed on Mar. 23, 2021.

(51) Int. Cl.
*H04L 41/0803* (2022.01)
*H04L 41/50* (2022.01)
*H04L 43/08* (2022.01)
*H04Q 9/00* (2006.01)

(52) U.S. Cl.
CPC .............. *H04L 43/08* (2013.01); *H04Q 9/00* (2013.01); *H04L 43/045* (2013.01)

(58) Field of Classification Search
CPC ............. H04L 41/5012; H04L 41/5009; H04L 41/5032; H04L 41/046; H04L 34/045; H04L 43/028; H04L 43/091
See application file for complete search history.

(56) References Cited

U.S. PATENT DOCUMENTS

| | | | | |
|---|---|---|---|---|
| 10,938,661 | B1* | 3/2021 | Pignataro | ............ H04L 41/5045 |
| 11,204,961 | B1* | 12/2021 | Farber | ..................... H04L 67/61 |
| 2005/0119996 | A1* | 6/2005 | Ohata | ................. G06F 11/3495 |
| 2010/0131638 | A1 | 5/2010 | Kondamuru | |
| 2013/0297791 | A1 | 11/2013 | Fallon et al. | |
| 2015/0181835 | A1* | 7/2015 | Woodward | ....... A61B 5/150992 119/421 |
| 2017/0123885 | A1 | 5/2017 | Margalit et al. | |
| 2017/0187642 | A1* | 6/2017 | Nolan | ................. H04L 67/5682 |
| 2019/0081879 | A1 | 3/2019 | Wu et al. | |
| 2019/0104019 | A1 | 4/2019 | Makovsky et al. | |
| 2019/0238443 | A1* | 8/2019 | Di Pietro | ............ H04L 41/0853 |
| 2019/0281373 | A1* | 9/2019 | Sadasivarao | .......... H04L 41/046 |
| 2020/0167260 | A1 | 5/2020 | Raghavendra et al. | |
| 2021/0111971 | A1* | 4/2021 | Pignataro | ............ H04L 41/0654 |
| 2021/0176142 | A1 | 6/2021 | Clarke et al. | |
| 2022/0174519 | A1* | 6/2022 | Chou | .................... H04W 24/08 |
| 2022/0278922 | A1* | 9/2022 | Kolar | .................. H04L 43/0894 |

OTHER PUBLICATIONS

Claise, et al., "Service Assurance for Intent-based Networking Architecture," draft-claise-opsawg-service-assurance-architecture-05, IETF, OPSAWG, Internet-Draft, https://www.ietf.org/archive/id/draft-claise-opsawg-service-assurance-architecture-05.txt, Apr. 23, 2021, 17 pages.

Claise, et al., "Service Assurance for Intent-based Networking Architecture," draft-claise-opsawg-service-assurance-architecture-03, IETF, OPSAWG, Internet-Draft, www.watersprings.org/pub/id/draft-claise-opsawg-service-assurance-architecture-03.html, Jul. 27, 2020, 12 pages.

Lim, et al., "Performance analysis of parallel computing in a distributed overlay network," Conference Paper, Abstract, https://www.researchgate.net/figure/Tree-based-Distributed-Computing-Model_fig1_225039134, Nov. 2011, 7 pages.

* cited by examiner

SERVICE ASSURANCE MONITORING BASED ON TELEMETRY

CROSS REFERENCE TO RELATED APPLICATION

This application is a continuation application of U.S. patent application Ser. No. 17/514,272, filed Oct. 29, 2021, now U.S. Pat. No. 11,706,103, which claims priority to U.S. Provisional Application No. 63/164,738, filed Mar. 23, 2021, the entireties of which are incorporated herein by reference.

TECHNICAL FIELD

The present disclosure relates to assurance of services enabled on networks.

BACKGROUND

Large amount of data is generated by network devices in a production network. Various applications are built to process the data to monitor network status and health. Network operators expect full service assurance but monitoring resources are finite in number and consuming large amount of data creates multiple scalability issues. Additionally, transferring the data across network consumes network bandwidth and processing the data in a centralized location consumes processing resources and memory. Services may be provided as disjoint application each having its own control plane and data plane solutions. As such, delivering service assurance to enterprises by monitoring the production network is a complex task.

DESCRIPTION OF EXAMPLE EMBODIMENTS

Overview

Figure 1:
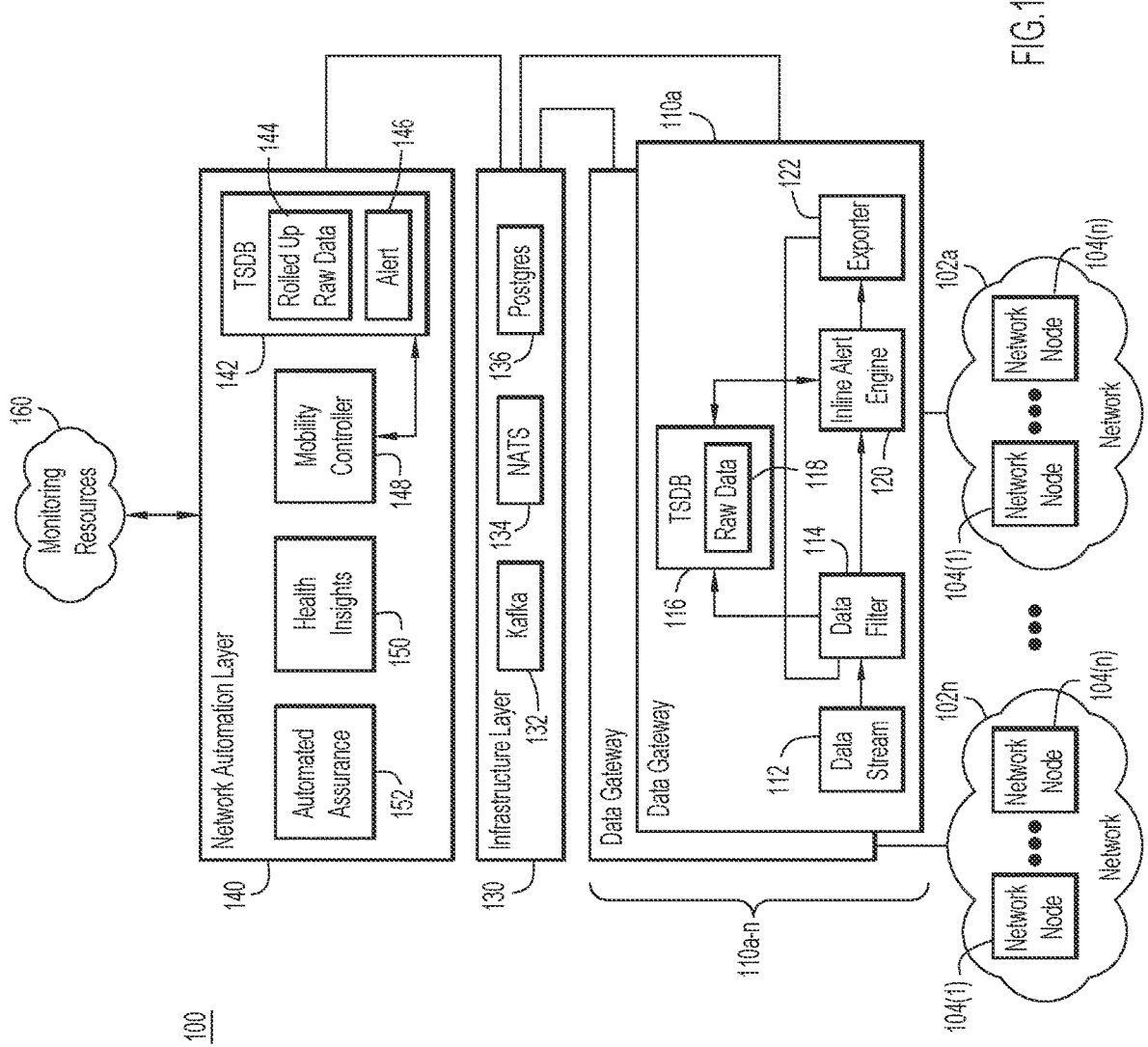
FIG. 1 is block diagram of a system configured to adjust and scale assurance monitoring for a network-based service, according to an example embodiment.

A method is performed at one or more entities configured to modify assurance monitoring for a service enabled on a network based on various operational states in the network. The method involves establishing, based on service configuration information, an assurance monitoring for a service provided by a plurality of network nodes that establish network connectivity for the service. The service includes a plurality of sub-services. The method further involves obtaining, from the plurality of network nodes, telemetry data related to the service and determining one or more operational states of the plurality of network nodes based on the telemetry data. The method further involves modifying the assurance monitoring for the service based on the one or more operational states of the plurality of network nodes.

EXAMPLE EMBODIMENTS

A service assurance monitoring provides service assurance for intent-based networking (SAIN), for example. The service assurance monitoring leverages programming capabilities of network devices in the intent-based network (also referred to as a "service network" or simply a "network"), and model/event driven metrics in telemetry obtained from the network devices, to deliver end-to-end service assurance for various services.

Service assurance monitoring may include a network orchestrator, service operators to provide instructions to the network orchestrator, an assurance orchestrator that communicates with the network orchestrator, assurance agents that communicate with the assurance orchestrator, assurance collectors that communicate with the assurance agents and the service operators, and network devices that communicate with the network orchestrator and the assurance collectors. Network orchestrator configures network devices to implement an intent-based service network enabled to provide a variety of services to end users.

Network devices may include routers, switches, gateways, and other network devices (physical or virtual). That is, network devices may be collection points, computing devices, virtual machines, etc. (collectively referred to as "network nodes") that communicate via one or more networks. The one or more networks may include a local area network (LAN), a wide area network (WAN) such as the Internet, or a combination thereof, and includes wired, wireless, or fiber optic connections. In general, the one or more networks can use any combination of connections and protocols that support communications between the network devices.

In one example, the entities or nodes may each include a network interface, at least one processor, and a memory. Each entity may be any programmable electronic device capable of executing computer readable program instructions. The network interface may include one or more network interface cards that enable components of the entity to send and receive data over the one or more networks. Each entity may include internal and external hardware components such as those depicted and described in further detail in FIG. 6.

In one example embodiment, one or more entities may be deployed in a cloud with its functionality distributed over a number of hardware devices.

Assurance orchestrator, assurance agents, and assurance collectors are generally referred to as one or more "assurance entities" configured to provide assurance for services on a network. Assurance orchestrator may include applications and/or services hosted on one or more server devices (more simply referred to as servers), for example, in a cloud-based data center. Assurance orchestrator may also include applications and/or services hosted on one or more server devices, which may be the same as or different from the servers used by network orchestrator. Similarly, assurance collectors may also include applications and/or services hosted on one or more servers, which may be the same as or different from the servers used by assurance orchestrator. In an example embodiment, assurance collectors are applications integrated into assurance orchestrator. Assurance agents may each include applications and/or services hosted on one or more servers, and may be distributed geographically to be near respective ones of network devices enabled for services to be monitored under control of the assurance agents. Network orchestrator, assurance orchestrator, assurance agents, assurance collectors, and network devices may communicate with each other over one or more networks, described above.

Service assurance monitoring may support one or more services. To this end, service operators provide, to network orchestrator service, intent-based instructions to setup/configure the services for end users. Service operators also receive requests for assurance (e.g., "get assurance" requests) for the services from assurance collectors, and forward the requests to network orchestrator.

Responsive to the aforementioned instructions and the requests sent by service operators, network orchestrator derives and sends to network devices intent-based network device configuration information to configure the network devices/service network for the services. In addition, network orchestrator derives and sends to assurance orchestrator service configuration information for providing assurance for the services enabled on service network. Service configuration information includes, for each service deployed or implemented on service network, respectively, a definition of the service, including a service type (e.g., a type of network connectivity), a service instance (e.g., an identifier or name of the service), and configuration information that describes how the service is actually implemented of service network. That is, the definition of the configuration of the service is reflective of how the service is instantiated as a collection of the sub-services in service network.

For network device configuration information, network orchestrator may employ, for example, the Network Configuration Protocol (NETCONF) (or, similarly, Representational State Transfer (REST) Configuration (RESTCONF)) to push intent-based network device configuration objects, such as Yet Another Next Generation (YANG) models or objects, to network devices. Similarly, for services configuration information, network orchestrator may also employ, for example, NETCONF to push intent-based service configuration YANG objects to assurance orchestrator. YANG is a data modeling language used to define data sent over a NETCONF compliant network to configure resources. NETCONF are used to install, manipulate, and delete configurations of the resources, while YANG is used to model both configuration and state data of the resources. YANG models/objects used to implement embodiments presented herein may include YANG models/objects extended to include service-specific metadata annotations in accordance with RFC 7952, for example, or any other format that may be the subject of a future standard.

The assurance orchestrator may operate as a mobility controller, explained in greater detail with reference to FIG. 1, for assurance of the services deployed on service network. That is, the assurance orchestrator employs "service awareness" to control assurance for the services deployed on service network. In this role, the assurance orchestrator performs several main operations. First, the assurance orchestrator generates, from the service type and the service instance in the definition of each service defined in service configuration information, a unique service tag for the service. In an example, the service tag for a given service may be a tuple that includes the service type and the service instance from the definition of the given service. The service tag may be used to distinguish the service to which it pertains from all other services.

Second, the assurance orchestrator decomposes (i.e., breaks down, separates and/or extracts) the definition of each service defined in service configuration information into a respective sub-service dependency graph of sub-services and dependencies/interdependencies between the sub-services that collectively (actually) implement the service on a network. That is, the assurance orchestrator dissects each service into the respective sub-service dependency graph. The sub-service dependency graph includes (sub-service) nodes that represent the sub-services and links between the nodes that represent the dependencies between the sub-services. The sub-service dependency graph may include the service type and the service instance (e.g., the service tag) for the service represented by the sub-service dependency graph. To assist with the aforementioned decomposition, the assurance orchestrator may poll or query various network devices identified in the definition to discover sub-services, such as packet routing protocols, implemented on the network devices and that are to be incorporated into the sub-service dependency graph. In a non-limiting embodiment, the sub-service dependency graph includes a sub-service dependency tree having a root node that represents the services, and nodes that represent the sub-services and that have parent-child relationships (i.e., the dependencies) between the nodes/sub-services that lead back to the root node. An example of a sub-service dependency tree or commonly referred to as "assurance graph" is described below in connection with FIG. 2. Other types of graph constructs/data structures may be used to represent the sub-service dependency graph, as would be appreciated by one of ordinary skill in the art having read the present application.

Third, the assurance orchestrator derives from each sub-service dependency graph a respective set of heuristic packages for the service described by the sub-service dependency graph. The heuristic packages (i) specify/define service-related metrics (i.e., sub-service metrics) to be monitored/recorded and reported by the sub-services, and that are indicative of health statuses/states (healthy state or unhealthy state) of the sub-services, i.e., that are indicators of health states of the sub-services, (ii) include rules to determine/compute key performance (KPIs) including the health states of the sub-services (also referred to individually as a "sub-service health state," and collectively as "sub-service health states") based on the sub-service metrics as recorded and reported, and (iii) which sensor paths (i.e., telemetry paths) are to be enabled for reporting telemetry, i.e., to report the sub-service metrics recorded by the sub-services from the sub-services. The heuristic packages may also include or be associated with the service tag for the service to which the heuristic packages correspond. The assurance orchestrator employs the heuristic packages to configure assurance agents to monitor the sub-services of the services, and to compute the health states of the sub-services based on the monitoring, as described below. KPIs and other metrics are collectively referred to as "telemetry data".

Fourth, the assurance orchestrator provides, to assurance agents, configuration information including the heuristic packages and their corresponding service tags in association with each other. The assurance orchestrator may employ NETCONF to push the heuristic packages as YANG objects to assurance agents. The assurance orchestrator may also provide the sub-service dependency graphs to assurance collectors in configuration information.

As explained above, the assurance orchestrator derives an assurance graph from service configuration and sends to the assurance agents along with one or more configuration options. The assurance agents are responsible for building the expression graph and computing health statuses. Although the assurance collector provides feedback to the assurance orchestrator, the assurance graph is not changed. The assurance graph is static and limited in functionality especially in large-scale networks.

Techniques presented herein provide for dynamically modifying or adjusting the assurance graph, and thus assurance monitoring for services. For example, techniques presented herein utilize one or more operational state changes to alter the assurance graph even in the absence of a configuration change, thereby providing service assurance on a large-scale network.

Additionally, techniques presented herein further utilize operational state of a monitoring service (assurance orchestrator, assurance agents, and assurance collectors) itself to modify the assurance graph.

Further, techniques presented herein provide scaling of assurance monitoring based on service configuration, service scale, and available monitoring resources. The techniques presented herein may handle streaming telemetry from a large set of network nodes. Depending on the number of sensors and the cadence of collection, this can be an overwhelming task for any assurance monitoring, the techniques presented herein provide a feedback system that complements the SAIN feedback system, explained above, to handle large-scale networks.

The techniques presented herein may apply to multiple different environments, wireline and wireless, including fifth generation (5G) networks, fourth generation (4G) networks, virtual infrastructure manager (VIM), and even virtual functions. Techniques presented herein raise alerts in sub-trees, correlate to yield overall health of a service, and provide feedback to network orchestrator, as detailed below.

FIG. 1 is block diagram of a system 100 configured to adjust and scale assurance monitoring for a network-based service, according to an example embodiment. The system 100 includes a plurality of networks 102*a-n* with a plurality of network nodes 104(1)-104(*n*) therein, a data processing layer that includes a plurality of data gateways 110*a-n*, an infrastructure layer 130, a network automation layer 140, and monitoring resources 160. The notations "a-n", "1-n", etc. denote that a number is not limited, can vary widely, and depends on a particular use case scenario.

The system 100 provides a distributed data pipeline to facilitate collection and correlation network performance and monitoring data, according to an example embodiment. The system 100 creates a generic pipeline and alert engine for one or more network automation applications that results in an integrated solution for the applications to collaborate coherently. The distributed pipeline allows users to dynamically construct policy trees specifying rules on desired network metrics (telemetry data) and raise alerts accordingly. Symptoms and alerts are correlated at centralized location to provide an overall health of the network-based service.

The network automation layer 140 distributes data processing across data pipelines in the data gateways 110*a-n* to help them perform at a higher scale. Scale is typically multi-dimensional but is tied proportionally to the number of network nodes 104(1)-104(*n*) in the networks 102*a-n*. The data gateways 110*a-n* thus allow the network automation layer 140 to improve scaling by offloading and distributing resource intensive activity across multiple data gateways 110*a-n*. As such, the data gateways 110*a-n* play a role in helping the network automation layer 140 (assurance applications therein) to scale.

Specifically, the assurance applications may choose to break their resource intensive tasks and offload those functions to the data gateways 110*a-n*. This can be accomplished by the assurance applications distributing policy trees or sub-trees specifying monitoring rules across the data gateways 110*a-n*. A policy tree defines rules how to ascertain the operational health of a network service by identifying measurable metrics and related computations to apply on those metrics. The offloaded functions thus scale independent of the assurance applications scale. Each offload function deals with a smaller amount of pre-processed data because of the distributed processing. As a result, the assurance applications as a whole work off a much smaller volume of post-processed information.

In one example embodiment, the traffic from the data gateways 110*a-n* to the network automation layer 140 is kept to a bare minimum. This is beneficial not only from an overlay network bandwidth perspective, but also from an application data-handling perspective. In yet another example embodiment, data is dumped from the data gateways 110*a-n* to assess an overall health of the network-based service.

The data gateways 110*a-n* communicate with the network automation layer 140 using the infrastructure layer 130 and also communicate with the network nodes 104(1)-104(*n*) in the networks 102*a-n* to gather or record telemetry data related to the service.

The network nodes 104(1)-104(*n*) (a first network node 104(1) and a second network node 104(*n*)) may include routers, switches, gateways, and other network entities (physical or virtual). The network nodes 104(1)-104(*n*) are collection points, computing devices, virtual machines, etc. that communicate via the networks 102*a-n*. The networks 102*a-n* (a first network 102*a* and a second network 102*n*) may include a local area network (LAN), a wide area network (WAN) such as the Internet, or a combination thereof, and includes wired, wireless, or fiber optic connections. In general, the networks 102*a-n* can use any combination of connections and protocols that support communications between the network nodes 104(1)-104(*n*). The network nodes 104(1)-104(*n*) establish network connectivity for one or more services being monitored and are also assurance collectors that gather or record telemetry data for one or more services.

The data gateways 110*a-n* may also serve as the assurance agents that facilitate collection and correlation network performance and monitoring data from the assurance collectors (the network nodes 104(1)-104(*n*)), according to an example embodiment.

Specifically, a distributed pipeline is co-located with the data source such that each of the data gateways 110*a-n* is a data pipeline that has a data stream 112, a data filter 114, a local time series database (TSDB) 116 that stores raw data 118, an inline alert engine 120, and an exporter 122. The system 100 depicts these components with respect to the data gateway 110*a* and shows the data gateway 110*a* being connected to the first network 102*a*. This is but one non-limiting example and allocation of the network nodes 104(1)-104(*n*) in various networks 102*a-n* to the data gateways 110*a-n* and components of the data gateways 110*a-n* depend on a particular deployment and use case scenario.

In the system 100, the data gateway 110a obtains data stream 112, which is telemetry data obtained from the network nodes 104(1)-104(n) in the first network 102a. The telemetry data relates to the service being monitored and is gathered or recorded by the network nodes 104(1)-104(n) based on a policy tree provided from the network automation layer 140.

The data filter 114 filters data from the data stream 112 and provides the filtered data to the local TSDB 116 of the data gateway 110a. Filtering may include but is not limited to removing extraneous data or tags (based on this policy tree) and structuring data in a particular format. The filtered data is stored in the local TSDB 116 as the raw data 118.

In one example embodiment, users may dynamically program desired device metrics and alert thresholds. This achieves data reduction at the edge. Dynamic metrics programming may be achieved for variety of protocols/platforms, such as but not limited to: gRPC Network Management Interface (gNMI), Model-Driven Telemetry (MDT), Simple Network Management Protocol (SNMP), Command Line Interface (CLI), and Bulkstats. Precedence rules can be specified for different types of device metrics. The device metrics (telemetry data) is obtained by an assurance agent (the data gateway 110a) from assurance collectors (network nodes 104(1)-104(n)). The metrics or KPI collected may be sub-service metrics as specified in configuration information for the assurance monitoring. The configuration information may be provided from the network automation layer 140 in a form of a policy sub-tree using the infrastructure layer 130. Policy trees or sub-trees on desired device metrics may be dynamically constructed for processing the data stream 112 by the data filter 114.

For example, a network service that is decomposed into smaller sub-services to form a policy tree linked through the dependencies. The policy trees detail how to fetch the metrics and how to compute the health status for each sub-service instances. The sub-services can span across the networks 102a-n. The sub-service health computed based on the policy trees can then be recombined to produce the service health. The policy trees may be decentralized as close as possible to the metric sources. The health status of each sub-service is from the respective edges (distributed inline alert engine 120). The policy tree maintains a function or procedure that produces heath states from metrics fetched from the network nodes 104(1)-104(n).

The inline alert engine 120 evaluates device metrics at the edge. Symptoms and alerts are raised according to the user-defined policy trees. Symptoms and alerts are correlated at a centralized location (e.g., the network automation layer 140) to provide an overall health of the service.

The inline alert engine 120 handles a filtered data stream and may employ the local TSDB 116 (and raw data 118 therein) and provide an alerting mechanism. This is one way to track any sensor on the network nodes 104(1)-104(n). It provides a common alerting infrastructure for the network automation layer 140 (assurance automation applications and/or assurance orchestrator). That is, based on an alert from the inline alert engine 120, the raw data 118 or the filtered data may be exported to the network automation layer 140, using the exporter 122. The exporter 122 connects with the infrastructure layer 130 to stream raw data 118 to the network automation layer 140.

The infrastructure layer 130 may be a multi-protocol interface that facilitates a connection of various different data gateways 110a-n to the network automation layer 140. The infrastructure layer 130 may include various communication and/or streaming protocols such as, but not limited to, Kafka 132, NATS 134, and Postgres 136.

In the system 100, the network automation layer 140 includes a centralized TSDB (TSDB) 142, a mobility controller 148, a health insights application (HI) 150, and automated assurance application (automated assurance) 152. The mobility controller 148 is an example of an assurance orchestrator and the HI 150 and the automated assurance 152 are examples of assurance monitoring applications configured to monitor health of a service provided by the network nodes 104(1)-104(n) and/or health of various sub-services that make up the service.

The TSDB 142 is an external and/or centralized database that may include a portion or all of the raw data 118 from each of the data gateways 110a-n. The TSDB 142 stores rolled up raw data 144, which may be filtered data that is exported, using the exporter 122, from one or more data gateways 110a-n based on alerts raised by the inline alert engine 120. The TSDB 142 further includes an assurance alerts (alert) 146.

The alert 146 is configured to trigger changes in the assurance monitoring for a service. The alert 146 provides a common alerting infrastructure for various assurance applications and an assurance orchestrator. That is, the system 100 using the alert 146 provides an integrated solution across different assurance monitoring applications. The alert management part (e.g., composite alerts, alert suppression, filtering, distribution etc.) is a function that can be maintained either in the network automation layer 140 or the data gateways 110a-n depending on the amount of flexibility required.

The mobility controller 148 is configured to process rolled up raw data 144 to detect operational state changes that trigger alert 146 and require changes to assurance monitoring for a service. That is, the mobility controller 148 communicates with HI 150 and/or automated assurance 152 to adjust monitoring performed by these assurance applications.

One example of a service is a 5G network service in which various network functions (NFs) are sub-services. The mobility controller 148 is a 5G network controller that processes bulkstats metrics from 5G (or other mobile network type) NFs and raises alerts (based on the alert 146), such as, the ones associated with Native Network Functions on Subscriber Microservices Infrastructure (SMI) and User Plane Function (UPF) on Kernel-based Virtual Machine (KVM).

The HI 150 plays a dual role in that it provides a network automation graphical user interface (GUI), described below with reference to FIG. 4. The GUI is user driven workflows for alerting as well as an application driven workflow for alerting.

The automated assurance 152 may include aspects of service assurance that are device-centric and/or aspects of service assurance that are network-centric. Services themselves are abstract network concepts that are realized using different device constructs. As part of service assurance, the device centric feature checks are offloaded to the data gateways 110a-n, while the network centric aspects are processed centrally at the network automation layer 140.

In the example of the 5G network service, the mobility controller 148 uses the HI 150 to monitor health of each individual NFs and uses the automated assurance 152 to monitor service health of network slices. The mobility controller 148 uses the alert 146 to modify assurance monitoring performed by the HI 150 and the automated assurance 152. As noted above, the alert 146 is raised based on the rolled up raw data 144 which includes operational states of various NFs and network slices (e.g., the network nodes 104(1)-104(n)). In this approach, all data requested by the end user may make it into the TSDB 142. The user-supplied rules are passed down into the inline alert engine 120 of various data gateways 110a-n via policy trees (split up into various subtrees). The alerting data is reported to the network automation layer 140. While in one example, the raw data 118 may remain in local TSDBs (the local TSDB 116) to reduce the amount of data exported to the TSDB 142, in another example, complexities of an assurance monitoring task may require data to be exported to the TSDB 142.

For example, the HI 150 across the networks 102a-n addresses use cases where KPIs are to be monitored across several network nodes 104(1)-104(n) and a complex determination is made of a network-wide KPI. To address these sort of use-cases, the TSDB 142 is used. However, the TSDB 142 is not fed raw data from the network nodes 104(1)-104(n), but instead has post-processed data from the inline alert engine 120 being written into the TSDB 142. As such, the rolled up raw data 144 is aggregated raw data from various data gateways 110a-n. The local TSDB 116 on the data gateway 110a may be time limited (storage is limited to a few hours), while the assurance monitoring task may require a longer interval and/or aggregate data. It may be useful to capture some aggregate data collected over a fixed interval (for example, an hour) to the TSDB 142. With the TSDB 142, there are several data gateways 110a-n that dump their raw data 118 to the TSDB 142. Longer term trends can then be captured on the TSDB 142 by the mobility controller 148 or other processing entity or entities.

The monitoring resources 160 are resources required to perform assurance monitoring. The monitoring resources 160 are available resources utilized by the mobility controller 148, the HI 150, and the automated assurance 152. The monitoring resources 160 include the data gateways 110a-110n that perform monitoring services for the network automation layer 140. The monitoring resources 160 include processing, memory, storage, and detection resources.

The mobility controller 148 monitors operating states of the monitoring resources 160 (whether the resource is in a healthy or unhealthy state) and adjusts the assurance monitoring based on the availability and/or operating states of these monitoring resources 160. For example, if the mobility controller 148 detects a change in the availability of the monitoring resources 160 such as lack of available processing power, shortage in storage, faulty sensors, etc., the assurance monitoring may be scaled down by turning off optics monitoring. As another example, if the mobility controller 148 detects that the data gateway 110a is not responding, assurance monitoring of a sub-service performed by the network nodes 104(1)-104(n) in the first network 102a may be turned off.

Figure 2:
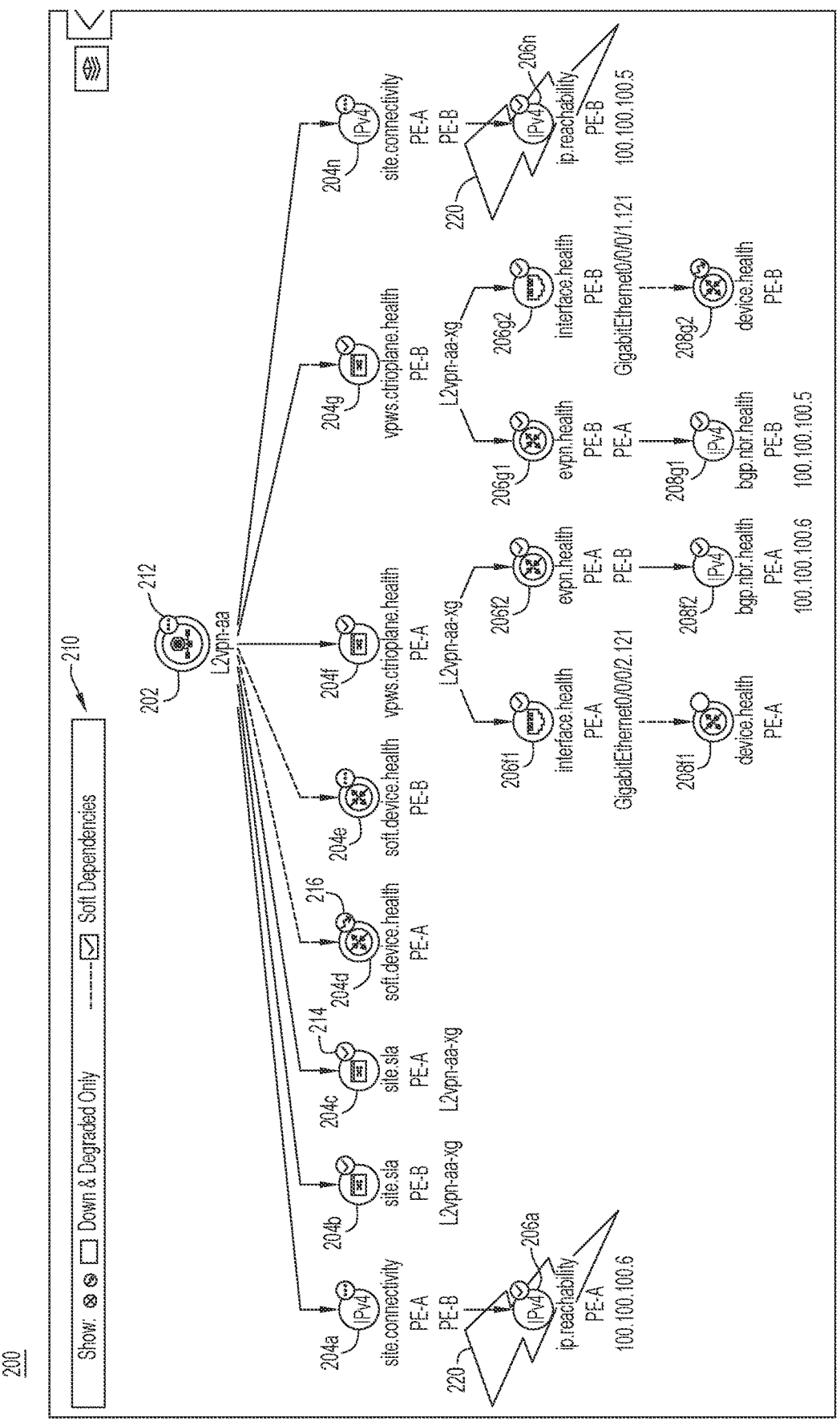
FIG. 2 is a diagram illustrating a service assurance graph with health status view of a layer 2 virtual private network service, according to an example embodiment.

With continued reference to FIG. 1, FIG. 2 shows a service assurance graph 200 with health status view of layer 2 virtual private network (L2vpn) service, according to an example embodiment. The service assurance graph (assurance graph) 200 includes a network service at a root node with various sub-services provided as layers or child nodes. The HI 150, under the control of the mobility controller 148 and using the data gateway 110a, monitors an L2vpn network service and generates the assurance graph 200. A granularity of a service varies depending on the service type and its deployment.

Specifically, the assurance graph 200 includes a root node 202 that depicts an overall health of the network service being monitored. The assurance graph 200 further includes a first layer of sub-services 204a-n (IPv4 A to B 204a, site B 204b, site A 204c, a node A 204d, soft device 204e, an edge node A 204f, an edge node B 204g, and an UPv4 B to A 204n). Some of the first layer of sub-services 204a-n may include its own micro-services or sub-services. For example, the sub-service IPv4 A to B 204a includes a second layer subservice (a reachability A sub-service 206a), the edge node A 204f sub-service includes two child nodes (interface sub-services 206f1 and 206f2), the edge node B 204g sub-service also includes two child nodes (interface sub-services 206g1 and 206g2), and the UPv4 B to A 204n sub-service includes one child node (a reachability B sub-service 206n). The second sub-service layer may further include its own sub-services or micro-services. For example, the interface sub-services 206f1 and 206f2 each include one child node (a node health A 208f1 sub-service and a node health B 208f2 sub-service, respectively), and the interface sub-services 206g1 and 206g2 each include one child node (a node health C 208g1 sub-service and a node health D 208g2 sub-service, respectively).

The assurance graph 200 may further show dependencies between various sub-services or nodes, some of which may be soft dependencies (dotted line). The assurance graph 200 may further include one or more user-defined or user-selected filters 210. The filters 210 are selected to show health states of various network nodes of various network layers. As such, the assurance graph 200 includes health not determined indicator 212, a healthy sub-service indicator 214 showing that the respective sub-service is operating properly, and a degraded sub-service indicator 216 showing that the respective sub-service is experiencing congestion or is down.

Since assurance graph 200 can become large and sub-tree computation can be very intensive, the mobility controller 148 selectively enables certain sub-services based on various operational states obtained from the telemetry data. For example, based on detecting that KPIs collected exceed a threshold value (a predetermined reference value), the mobility controller 148 may disable monitoring of certain sub-services such as monitoring the health of the reachability A sub-service 206a and the reachability B sub-service 206n, as shown by a disabled monitoring indicator 220. According to another example, the reachability A sub-service 206a and the reachability B sub-service 206n are removed or pruned from the assurance graph 200 since they are no longer monitored.

As another example, the L3VPN depends on a routing protocol such as Border Gateway Protocol (BGP) which depends on an interface. The subservice InterfaceHealthy can be augmented with interface error rate KPI. Once a user specified or a pre-defined threshold or reference value is crossed, the subservice InterfaceHealthy instantiates dependencies such as OpticsHealthy when the interface relies on the optics. The OpticsHealthy starts monitoring voltage and temperature of the optics. When the error rate goes below threshold, the system automatically turn off OpticsHealthy monitoring (disables monitoring resource) so that the system can continue to monitor the large scale network efficiently. In short, the mobility controller 148 monitors its own system status (operating states of the available resources) and may turn off or disable optics monitoring based on its own system status. For example, in a system with constrained resources, the mobility controller 148 may prune leaves (remove the reachability A sub-service 206a and the reachability B sub-service 206n) from the assurance graph 200.

In summary, the distributed telemetry collectors are managed by the mobility controller 148. While a one-off collector may be built, an example embodiment describes managing the collectors all together with the mobility controller 148. The mobility controller 148 manages the lifecycle of the collection jobs and distribution of the jobs to different collectors or data gateways 110*a-n*, high-availability requirements and software lifecycle of the software running on them. The techniques presented herein support dynamically changing collection cadence as the services are scaled up or down or as the monitoring system metrics change. As a result, collectors, including gNMI, MDT, SNMP, CLI, etc., collect telemetry metrics from the network nodes 104(1)-104(*n*) at optimal cadence.

The changes in assurance monitoring are reflected on the assurance graph 200. In other words, the assurance graph 200 is dynamically adjusted based on operating states of the service (and/or its sub-services) and based on available resources of the network automation layer 140 regardless of configuration changes. The assurance graph 200 does not depend on configuration information and is no longer static but is scaled down and up based on operating states of the service and assurance monitoring. The system 100 provides a closed-loop approach to scale out. The assurance graph 200 (the assurance monitoring) changes dynamically based on both operational states and configuration information. Users define different KPIs to monitor network operational states. The mobility controller 148 may change the assurance monitoring based on operational states along without any changes in the service configuration information.

Figure 3:
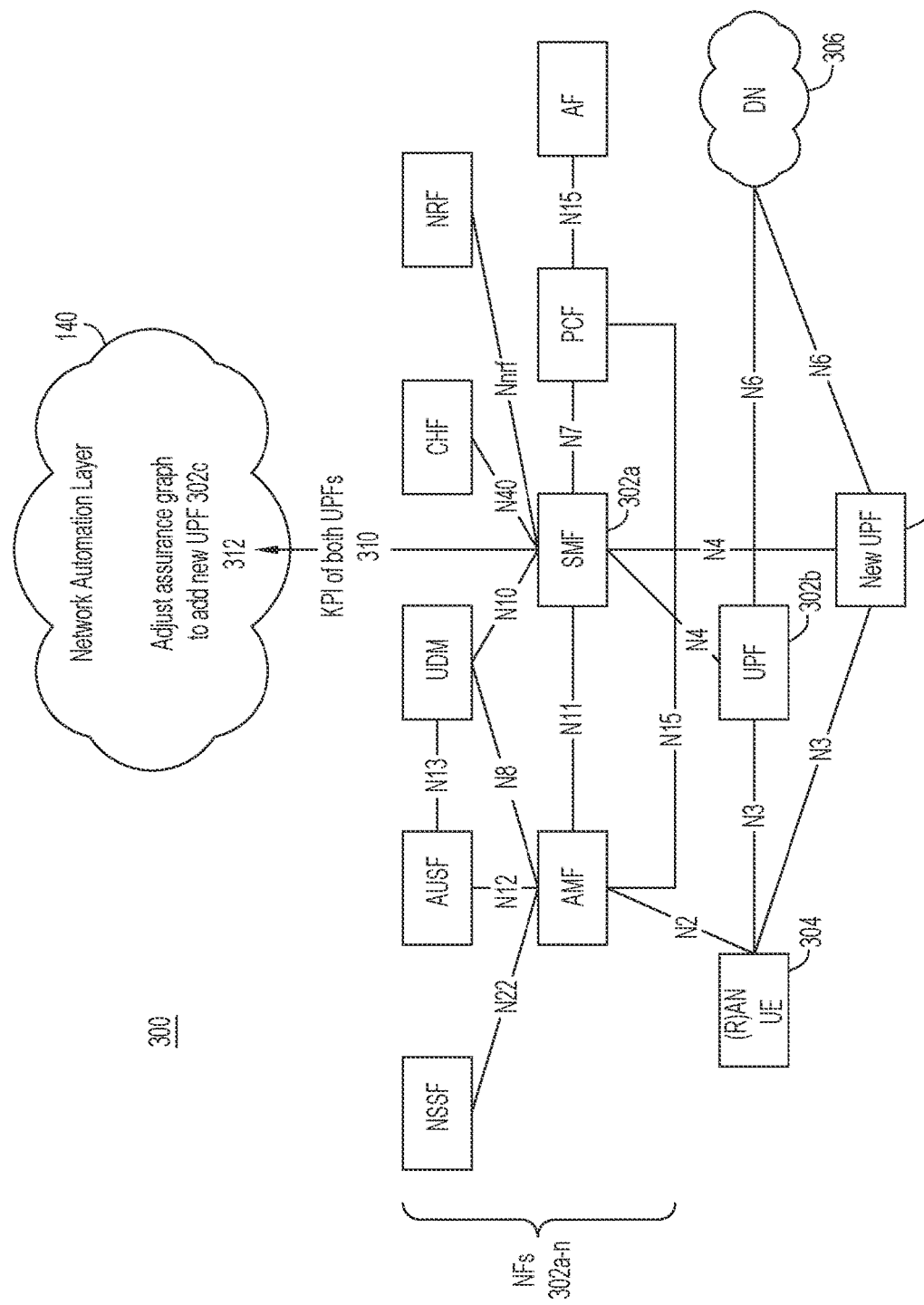
FIG. 3 is a diagram illustrating a user plane scale out in a fifth generation (5G) network service, according to an example embodiment.

With continued reference to FIG. 1, FIG. 3 is a diagram illustrating a user plane scale out in a fifth generation (5G) network service 300, according to an example embodiment. The 5G network service 300 includes NFs 302*a-n*, radio access network (RAN) 304, and a data network (DN) 306.

Some of the NFs 302*a-n* are control plane NFs such as a session management function (SMF) 302*a* and other NFs are user plane NFs (UPFs) such as a UPF 302*b*. The 5G network service 300 further includes the RAN 304 that services user equipment (UE) and the DN 306. The UPF 302*b* is responsible for connecting the UE to the DN 306. A change in an operating state of the 5G network service 300 (e.g., the UPFs) is detected based on KPIs and results in modifying the assurance monitoring. This change in operating state of the 5G network service 300 (instantiating a new UPF 302*c*), initiates a change in the assurance monitoring, according to an example embodiment.

Specifically, change in operational state changes the policy trees in the 5G user plane scale out as follows. A bandwidth KPI is enabled to monitor the outgoing traffic on the interface towards DN 306 on the UPF 302*b*. Next, an alert is raised once user specified bandwidth threshold is crossed. The alert indicates that the UPF 302*b* is overloaded with UE traffic. The alert then automatically triggers a deployment or instantiation of a new UPF 302*c*. As a result, the SMF 302*a* sub-tree is changed from one UPF child to two UPF children and the subscriber KPI on the SMF 302*a* is dynamically updated so that it correlates with the subscribers on both UPFs (the UPF 302*b* and the new UPF 302*c*).

At 310, the SMF 302*a* provides KPIs indicative of both UPFs to the network automation layer 140. The mobility controller 148 then changes the sub-tree and the correlation logic based on operational state change detected by the KPIs, in contrast to a static configuration of a typical assurance monitoring. In other words, at 312, the mobility controller 148 dynamically modifies the assurance graph 200 to add the new UPF 302*c*. That is, assurance monitoring is modified to include the new UPF 302*c* that is newly instantiated.

Figure 4:
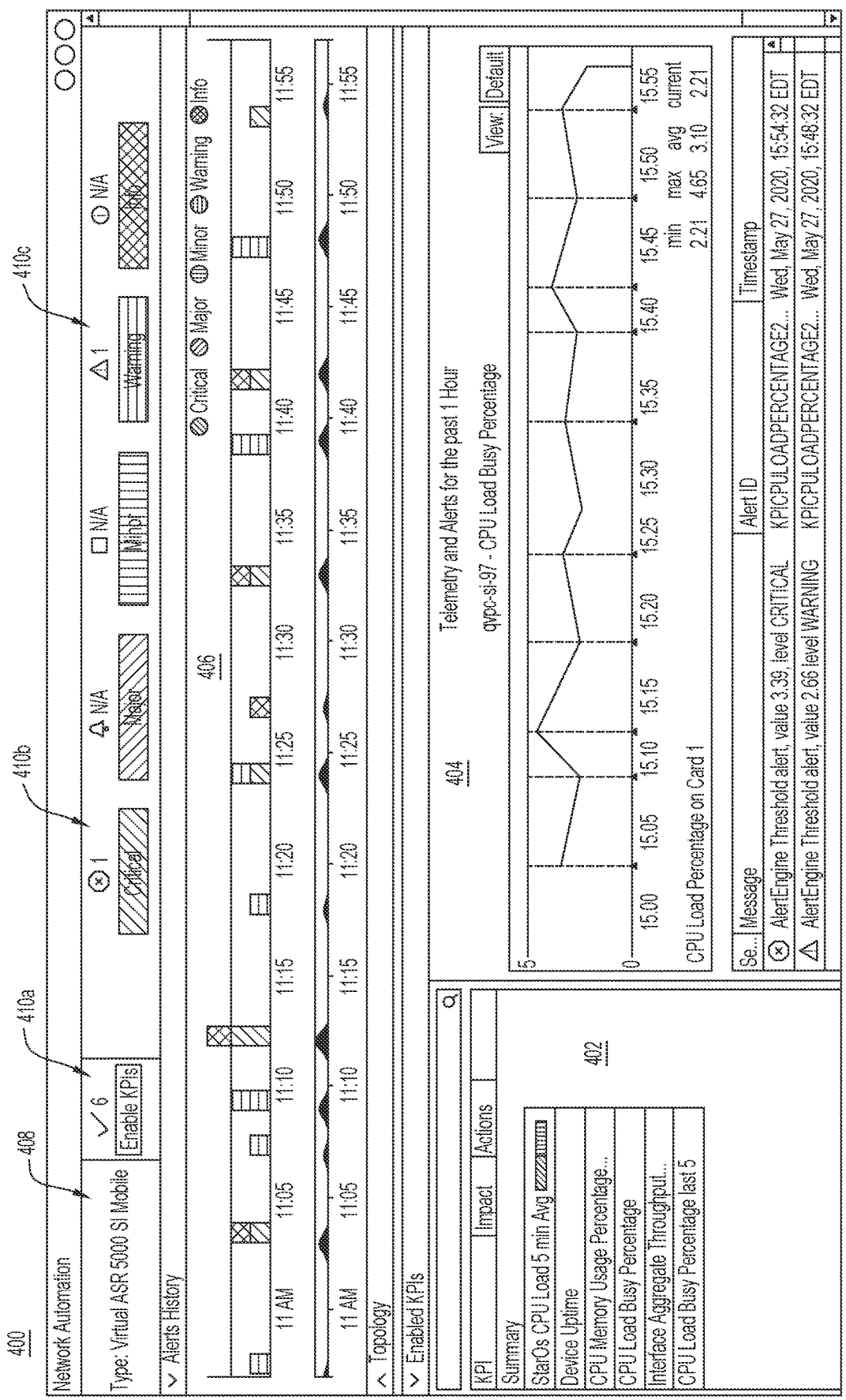
FIG. 4 is a diagram depicting an example user interface screen to visualize alerts generated over a period of time from network performance and monitoring data, according to an example embodiment.

With continued reference to FIG. 1, FIG. 4 shows an example user interface screen 400 depicting telemetry data and alerts generated over a period of time, according to an example embodiment. The user interface screen 400 illustrates dynamically adjusted assurance monitoring that may be provided by the HI 150. The user interface screen 400 includes user-enabled KPIs 402, a telemetry over a time interval 404, an alert history 406, and a summary 408.

The user and/or the mobility controller 148 may enable or disable one or more KPIs. Multiple KPIs were enabled on a network device and the user interface screen 400 shows six user-enabled KPIs 402.

The telemetry over a time interval 404 includes telemetry data collected over time, for example, CPU load KPI. The telemetry data was processed in the data pipeline in the data gateway 110*a*, alerts were raised by the inline alert engine 120 and/or the mobility controller 148 using alert 146, according to user specified or default thresholds.

The alert history 406 is a bar chart that shows the alert history and trending on different severity levels over time. For example, the alert history 406 shows critical alerts (red bars) and warnings (yellow bars) raised on a mobility device along with the telemetry data collected from the device in a predetermined time interval (the past hour).

The summary 408 provides attributes of the assurance monitoring and includes a number of enabled KPIs 410*a*, a number of critical alerts 410*b*, and a number of warning 410*c*. The summary 408 may further include a summary of changes in assurance monitoring based on changes on operating states of the service and/or assurance monitoring.

In summary, a system and techniques are provided for generating a generic pipeline and alert engine for network automation applications that results in an integrated solution for the assurance applications to collaborate coherently. The distributed pipeline allows users to dynamically construct policy trees on desired network metrics and raise alerts accordingly. Symptoms and alerts are correlated at centralized location to provide overall health of the network. The system and techniques further modify assurance monitoring based on operating states of the service (network nodes, sub-services, etc.) and/or the monitoring service itself, resulting in a closed loop approach to scale out. The policy trees and/or assurance graphs are dynamically changes based on operational states even without any changes to the service configuration information.

Figure 5:
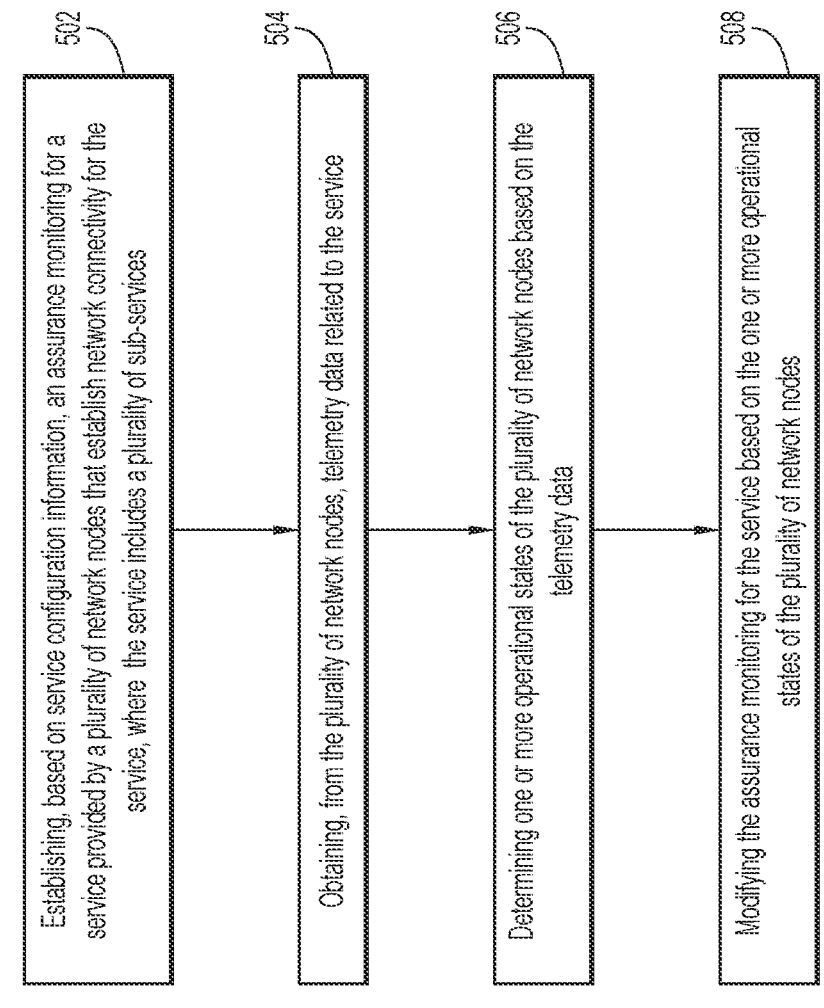
FIG. 5 is a flow diagram illustrating a method for modifying an assurance monitoring for a service based on one or more operational states of network nodes, according to an example embodiment.

FIG. 5 is a flow diagram illustrating a method 500 for modifying an assurance monitoring based on one or more operational states of network nodes, according to an example embodiment. The method 500 is performed by one or more computing devices such as the network automation layer 140 and/or the mobility controller 148.

At 502, the method 500 involves establishing, based on service configuration information, an assurance monitoring for a service provided by a plurality of network nodes that establish network connectivity for the service, where the service includes a plurality of sub-services.

At 504, the method 500 involves obtaining, from the plurality of network nodes, telemetry data related to the service.

At 506, the method 500 involves determining one or more operational states of the plurality of network nodes based on the telemetry data.

At 508, the method 500 involves modifying the assurance monitoring for the service based on the one or more operational states of the plurality of network nodes.

According to one or more example embodiments, the assurance monitoring may be based on a policy tree that specifies rules for monitoring the service. The operation 508 of modifying the assurance monitoring for the service may include disabling or enabling monitoring of one or more of the plurality of sub-services based on determining a change in the one or more operational states.

In one instance, the operation 508 of modifying the assurance monitoring may be based on the one or more operational states without any change in the service configuration information.

In one form, the assurance monitoring may be performed by a monitoring service. The method 500 may further involve modifying the assurance monitoring for the service based on detecting a change in an operating state of the monitoring service.

According to one or more example embodiments, change in the operating state of the monitoring service may include one or more changes in available resources of the monitoring service. The available resources may include one or more of processing resources, memory resources, and sensor resources.

In one example, the one or more changes in the available resources may include an unhealthy state of one or more of the available resources. The operation 508 of modifying the assurance monitoring may include disabling one or more of the available resources of the monitoring service.

In another form, the assurance monitoring may be performed by a distributed monitoring service that includes a plurality of data gateways and a controller. The data gateways may perform the operation 504 of obtaining the telemetry data. The controller may perform the operation 508 of modifying the assurance monitoring. The method 500 may then further include a first gateway of the plurality of gateways obtaining a data set of the telemetry data and processing the data set of the telemetry data to determine the one or more operational states of respective network nodes being monitored by the first gateway. The method 500 may further involve, based on determining a change in the one or more operational states, alerting the controller to modify the assurance monitoring.

According to one or more example embodiments, the operation 504 of obtaining the telemetry data related to the service may include collecting, from the plurality of network nodes, one or more key performance indicators (KPIs) related to a network operational state.

In yet another form, the service may be a fifth generation (5G) network connectivity service. The operation 506 of determining the one or more operational states may include detecting a change in an operating state of a user plane function (UPF) based on the KPIs and at least one predetermined reference value and determining that at least one new UPF is to be instantiated based on detecting the change in the operating state of the UPF.

According to one or more example embodiments, the operation 508 of modifying the assurance monitoring includes changing an assurance graph to include the at least one new UPF. The method 500 may further involve performing the assurance monitoring of the UPF and the at least one new UPF based on the assurance graph.

In one instance, the operation 502 of establishing the assurance monitoring of the service may include decomposing the service into a sub-service dependency graph that indicates the plurality of sub-services and dependencies between the plurality of sub-services that collectively implement the service and based on the sub-service dependency graph, configuring the plurality of network nodes to record and report the telemetry data.

Figure 6:
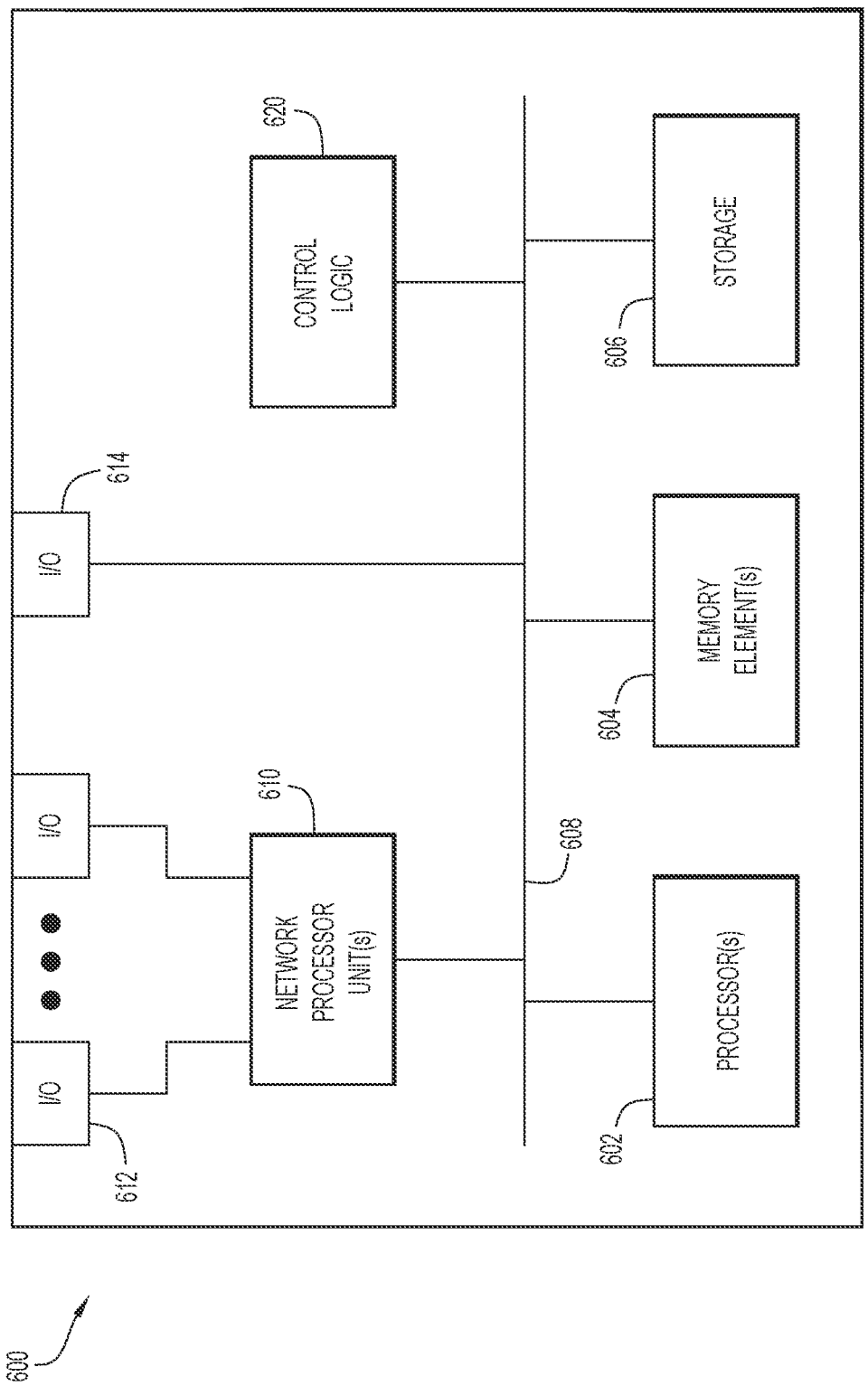
FIG. 6 is a hardware block diagram of a computing device that may be configured to perform the operations and techniques presented herein, according to one or more example embodiments.

Referring to FIG. 6, FIG. 6 illustrates a hardware block diagram of a computing device 600 that may perform functions associated with operations discussed herein in connection with the techniques depicted in FIGS. 1-5, according to various example embodiments, including, but not limited to, operations of one or more entries such as the mobility controller 148, the HI 150, the automated assurance 152, one of the data gateways 110a-n, and one of the network nodes 104(1)-104(n) of FIG. 1. It should be appreciated that FIG. 6 provides only an illustration of one embodiment and does not imply any limitations with regard to the environments in which different embodiments may be implemented. Many modifications to the depicted environment may be made. In various example embodiments, a computing device, such as computing device 600 or any combination of computing devices, may be configured as any entity/entities as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In another example embodiment, an apparatus is provided such as the mobility controller 148 of FIG. 1. The apparatus includes a memory, a network interface configured to enable network communications and a processor. The processor is configured to perform operations which include establishing, based on service configuration information, an assurance monitoring for a service provided by a plurality of network nodes that establish network connectivity for the service. The service includes a plurality of sub-services. The operations further include obtaining, from the plurality of network nodes, telemetry data related to the service, determining one or more operational states of the plurality of network nodes based on the telemetry data, and modifying the assurance monitoring for the service based on the one or more operational states of the plurality of network nodes.

In yet another example embodiment, one or more non-transitory computer readable storage media encoded with instructions are provided. When the media is executed by a processor, the instructions cause the processor to execute a method which involves establishing, based on service configuration information, an assurance monitoring for a service provided by a plurality of network nodes that establish network connectivity for the service. The service includes a plurality of sub-services. The method further includes obtaining, from the plurality of network nodes, telemetry data related to the service, determining one or more operational states of the plurality of network nodes based on the telemetry data, and modifying the assurance monitoring for the service based on the one or more operational states of the plurality of network nodes.

In yet another example embodiment, a system is provided that includes the devices and operations explained above with reference to FIGS. 1-6.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    establishing, based on service configuration information, an assurance monitoring for a service provided by one or more networks that establish network connectivity for the service, by decomposing the service into a sub-service dependency graph that indicates a plurality of sub-services and dependencies between the plurality of sub-services that collectively implement the service, and generating an assurance graph based at least on the sub-service dependency graph;
    determining one or more operational states related to one or more of the assurance monitoring or the one or more networks that establish the network connectivity for the service; and
    modifying the assurance monitoring for the service using the assurance graph and based on the one or more operational states, wherein changes in the assurance monitoring are reflected in the assurance graph by removing one or more sub-services from the assurance graph based on disabling monitoring of the one or more sub-services.

2. The method of claim 1, wherein determining the one or more operational states includes:
    detecting current one or more operational states of the one or more networks that establish the network connectivity for the service based on performance metrics or key performance indicators.

3. The method of claim 1, wherein determining the one or more operational states includes:
    determining the one or more operational states of a plurality of network nodes in the one or more networks, the plurality of network nodes establish the network connectivity for the service.

4. The method of claim 1, further comprising:
    obtaining telemetry data related to the service, wherein determining the one or more operational states of the one or more networks or the assurance monitoring, is based on the telemetry data.

5. The method of claim 1, wherein the assurance monitoring is based on a policy tree specifying rules for monitoring the service.

6. The method of claim 1, wherein modifying the assurance monitoring for the service includes:
    disabling or enabling monitoring of one or more of the plurality of sub-services based on determining a change in the one or more operational states.

7. The method of claim 1, wherein modifying the assurance monitoring is based on the one or more operational states without any change in the service configuration information.

8. The method of claim 1, wherein the assurance monitoring is performed by a monitoring service, and further comprising:
    modifying the assurance monitoring of the service based on detecting a change in an operating state of the monitoring service.

9. The method of claim 8, wherein the change in the operating state of the monitoring service includes one or more changes in available resources of the monitoring service, the available resources including one or more of processing resources, memory resources, and sensor resources.

10. The method of claim 1, wherein the assurance monitoring is performed by a distributed monitoring service comprising a plurality of data gateways that obtain telemetry data and a controller that modifies the assurance monitoring, and further comprising:
    obtaining, by a first gateway of the plurality of data gateways, a data set of the telemetry data;
    processing, by the first gateway, the data set of the telemetry data to determine the one or more operational states of respective network nodes of the one or more networks being monitored by the first gateway; and
    based on determining a change in the one or more operational states, alerting the controller to modify the assurance monitoring.

11. The method of claim 1, wherein the service is a fifth generation network connectivity service, and determining the one or more operational states includes:
    detecting a change in an operating state of a user plane function (UPF); and
    determining that at least one new UPF is to be instantiated based on detecting the change in the operating state of the UPF.

12. The method of claim 11, wherein modifying the assurance monitoring includes changing the assurance graph to include the at least one new UPF, and further comprising:
    performing the assurance monitoring of the UPF and the at least one new UPF based on the assurance graph.

13. An apparatus comprising:
    a memory;
    a network interface configured to enable network communications; and
    a processor, wherein the processor is configured to perform operations comprising:
        establishing, based on service configuration information, an assurance monitoring for a service provided by one or more networks that establish network connectivity for the service, by decomposing the service into a sub-service dependency graph that indicates a plurality of sub-services and dependencies between the plurality of sub-services that collectively implement the service, and generating an assurance graph based at least on the sub-service dependency graph;

determining one or more operational states related to one or more of the assurance monitoring or the one or more networks that establish the network connectivity for the service; and modifying the assurance monitoring for the service using the assurance graph and based on the one or more operational states, wherein changes in the assurance monitoring are reflected in the assurance graph by removing one or more sub-services from the assurance graph based on disabling monitoring of the one or more sub-services.

14. The apparatus of claim 13, wherein the processor is configured to determine the one or more operational states by:

determining the one or more operational states of the one or more networks that establish the network connectivity for the service.

15. The apparatus of claim 13, wherein the processor is configured to determine the one or more operational states by:

determining the one or more operational states of a plurality of network nodes in the one or more networks, the plurality of network nodes establish the network connectivity for the service.

16. The apparatus of claim 13, wherein the processor is further configured to perform:

obtaining telemetry data related to the service, wherein the processor is configured to determine the one or more operational states of the one or more networks or the assurance monitoring based on the telemetry data.

17. One or more non-transitory computer readable storage media encoded with instructions that, when executed by a processor, cause the processor to execute a method comprising:

establishing, based on service configuration information, an assurance monitoring for a service provided by one or more networks that establish network connectivity for the service, by decomposing the service into a sub-service dependency graph that indicates a plurality of sub-services and dependencies between the plurality of sub-services that collectively implement the service, and generating an assurance graph based at least on the sub-service dependency graph;

determining one or more operational states related to one or more of the assurance monitoring or the one or more networks that establish the network connectivity for the service; and modifying the assurance monitoring for the service using the assurance graph and based on the one or more operational states, wherein changes in the assurance monitoring are reflected in the assurance graph by removing one or more sub-services from the assurance graph based on disabling monitoring of the one or more sub-services.

18. The one or more non-transitory computer readable storage media of claim 17, wherein determining the one or more operational states includes:

determining the one or more operational states of the one or more networks that establish the network connectivity for the service.

19. The method of claim 1, wherein modifying the assurance monitoring for the service includes:

changing the assurance graph to include at least one new function of the service for which monitoring is enabled.

20. The method of claim 1, wherein the assurance graph further includes a health state indicator for each sub-service indicative of whether each sub-service is operating properly, experiencing congestion, or is in an undetermined operating state.

* * * * *